(12) United States Patent
Bloom et al.

(10) Patent No.: US 6,594,043 B1
(45) Date of Patent: Jul. 15, 2003

(54) SYSTEM AND METHOD FOR PROVIDING AN EYE SAFE LASER COMMUNICATION SYSTEM

(75) Inventors: Scott H. Bloom, Encinitas, CA (US); James E. Dunn, Escondido, CA (US); Anthony Acampora, La Jolla, CA (US)

(73) Assignee: Air Fiber, Inc., San Diego, CA (US)

( * ) Notice: Subject to any disclaimer, the term of this patent is extended or adjusted under 35 U.S.C. 154(b) by 0 days.

(21) Appl. No.: 09/473,076

(22) Filed: Dec. 28, 1999

(51) Int. Cl.⁷ .................. H04B 10/08; H04B 10/00; H04K 3/00; G01J 1/32; G06M 7/00
(52) U.S. Cl. .................. 359/110; 359/111; 359/155; 359/169; 359/177; 359/170; 359/161; 250/205; 250/221
(58) Field of Search .................. 359/110, 111, 359/155, 161, 169, 177, 170; 250/205, 221, 169, 170

(56) References Cited

U.S. PATENT DOCUMENTS

| 3,566,126 A | | 2/1971 | Lang et al. ................ 250/199 |
| 4,856,011 A | * | 8/1989 | Shimada et al. ............. 372/38 |
| 4,882,774 A | | 11/1989 | Grotzinger ................ 455/617 |
| 5,060,304 A | | 10/1991 | Solinsky ................... 359/152 |
| 5,229,593 A | * | 7/1993 | Cato ........................ 250/205 |
| 5,264,955 A | | 11/1993 | Sakanaka et al. ........... 359/152 |
| 5,451,765 A | * | 9/1995 | Gerber ...................... 250/205 |
| 5,475,520 A | | 12/1995 | Wissinger .................. 359/172 |

(List continued on next page.)

FOREIGN PATENT DOCUMENTS

| EP | 0 756 431 A2 | 1/1997 |
| WO | WO 97/49204 | 12/1997 |
| WO | WO 98/20631 | 5/1998 |

Primary Examiner—Leslie Pascal
Assistant Examiner—M. R. Sedighian
(74) Attorney, Agent, or Firm—Knobbe, Martens, Olson & Bear, LLP (57) ABSTRACT

A system and method for producing an eye safe laser communication system. The system and method detects an interfering object in the optical path and cuts off or reduces the power in the communication beam to safe levels. In one embodiment, a second laser diode transmitter and receiver is installed in each network node. The laser transmitter is pointed at a corresponding network node and the pulses travel in parallel with the communication beam. The pulses are reflected back to the transmitting node where they are detected. Their flight time is measured. When an interfering object is present, in one scenario, the pulses bounce of the interfering object and return to the receiver in the transmitting node, resulting in a reduced flight time. This reduced flight time is interpreted as an interfering object and the beam is shut down or reduced to a safe level. In a second scenario, the interfering object absorbs the detection beam. In another embodiment, a CCD camera is used to capture a reflection from an object in the path of the communication link. In this embodiment the CCD has an overlapping field of view with the communication transceiver's transmit laser. The laser's transmission beam forms a baseline pattern on the CCD. Any pixel to pixel variation from the baseline pattern indicates an interference, thus triggering the system to shut down or reduce the power of the communication link. Another embodiment uses retroreflection of the human eye to detect interference by the human eye and an optical magnification device. In this embodiment, a CCD is used to detect signals bent back by retroreflection of the human eye. When such a signal is detected, the link is immediately shut down. Another embodiment utilizes the communication link itself and a detector in the receiver to detect instantaneous power drops caused by an interfering object. When an interfering object is detected, the system shuts down or reduces the power of the communication beam to an eye safe level.

9 Claims, 10 Drawing Sheets

U.S. PATENT DOCUMENTS

| | | | |
|---|---|---|---|
| 5,514,864 A | * 5/1996 | Mu-Tung et al. | 250/205 |
| 5,532,858 A | 7/1996 | Hirohashi et al. | 359/159 |
| 5,546,445 A | 8/1996 | Dennison et al. | 379/60 |
| 5,592,320 A | 1/1997 | Wissinger | 359/159 |
| 5,710,652 A | 1/1998 | Bloom et al. | 359/152 |
| 5,822,099 A | * 10/1998 | Takamatsu | 359/153 |
| 5,837,996 A | * 11/1998 | Keydar | 250/221 |
| 5,905,588 A | * 5/1999 | Takashima et al. | 359/181 |
| 6,049,593 A | 4/2000 | Acampora | 379/56.2 |
| 6,195,044 B1 | 2/2001 | Fowell | 342/367 |

* cited by examiner

SYSTEM AND METHOD FOR PROVIDING AN EYE SAFE LASER COMMUNICATION SYSTEM

RELATED APPLICATIONS

The present application is related to U.S. patent application Ser. No. 09/181,062, entitled "System and Method for Integrating a Network Node," Ser. No. 09/181,043, entitled "Wireless Communication Network," Ser. No. 09/181,044, entitled "System and Method for Improved Pointing Accuracy," all of which are of common assignee and were filed on Oct. 27, 1998. The present application is also related to U.S. patent application Ser. No. 09/035,373, filed Mar. 5, 1998, entitled "High Bandwidth Communication Systems for Large Buildings," and application Ser. No. 09/035,370, filed Mar. 5, 1998, entitled Hybrid Picocell Communication System." Each of these co-pending patent applications is incorporated herein by reference in their entirety.

BACKGROUND OF THE INVENTION

1. Field of the Invention

The present invention relates generally to optical communication systems, and more particularly to a system and method for providing an eye safe laser communication system.

2. Related Art

Recently, there has been tremendous growth in, the deployment of fiber-optic facilities by telecommunication carriers such as Regional Bell Operating Companies (RBOCs), cable carriers, and Competitive Local Exchange Carriers (CLECs). Deployment of these fiber-optic facilities, along with the introduction of technologies such as OC-192 and DWDM, has dramatically lowered the marginal cost of bandwidth on the fiber.

As a result of this development, there is extensive bandwidth and communications capability in a telecommunication backbone networks. Many homes, offices and other facilities, however, do not have a practical solution to interface with these high bandwidth backbone networks. Consequently, direct attachment of potential customers to these backbone networks remains very expensive.

For example, two traditional methods have been employed for directly attaching to these backbone networks. These methods include buried or aerial fiber interconnections, and wireless microwave connections. Both of these methods incur significant up-front costs before any revenue can be realized. For example, in the case of buried or aerial fiber, significant costs are associated with obtaining rights-of-way for the cable runs, and installing the cable by burying or hanging. In the case of a microwave system, significant up-front costs are associated with the microwave repeater equipment, and obtaining rights to suitable portions of the spectrum. Therefore, system developers and integrators have sought long and hard to find suitable solutions to this so called "last mile" problem.

Solutions to this problem are fully described in the related patent applications listed above. These solutions relate to a wireless optical communication network. The wireless communication network is typically configured to couple a backbone communication network to a plurality of users at a plurality of facilities. The wireless communication network typically includes a plurality of wireless network nodes. Each network node includes a wireless receiver and transmitter configured to provide an optical communication link with one or more network nodes. The transmitter/receiver pairs are disposed on a movable mounting structure that includes a motor drive mechanism to move the mounting structure in at least two dimensions for pointing the wireless optical transceiver to the designated network node(s).

A communication interface is typically included to provide communications between the wireless communication network and one or more facilities in close proximity to the node. At least one of the nodes can also include a second communications interface configured to couple the backbone communication network to the wireless communication network.

Typically, the network nodes are installed on top of buildings, towers or the like. In a typical implementation, the optical transceivers comprise a receiver that includes either a PIN diode or an avalanche photodetector diode. The optical transmitter typically includes an infrared laser diode with an output wavelength centered at approximately 780 nm.

Generally, the laser output generated by these systems is classified as "eye safe," which translates into a class 1 rating in accordance with ANSI Z.136 standards. Accordingly, no eye damage would result by looking directly into the aperture of one of these network node devices. In one embodiment, the class 1 rating is partly the result of a translucent shroud used to house each network node. Typically, the translucent shroud is comprised of an acrylic cylindrically shaped housing that surrounds the network node. In this embodiment, the distance between the laser and the housing surface is far enough to decrease the density of the laser to eye safe levels. Thus, even if someone were to put their eye right up against the shroud, no eye damage would occur.

The problem is, however, eye damage could result if an optical focusing device, such as a pair of binoculars, a telescope or the like, were used to look into the aperture of a network node. That is, even though the laser is eye safe to an unaided eye, it is not necessarily eye safe to an aided eye. Therefore, what is needed is a system and method for providing a wireless laser communication system that is eye safe even if an external optical focusing device is introduced into the optical path.

SUMMARY OF THE INVENTION

Accordingly, the system and method of the present invention provides a means for producing a laser communication system that is eye safe even when external devices are introduced into the optical path. In a preferred embodiment this is accomplished by detecting an interfering object in the optical path and cutting off the communication beam or reducing the power of the communication beam to a safe level.

In one embodiment, the present invention provides a second laser diode transmitter and receiver within each network node. The second transmitter and receiver are separate and distinct from the transmitter and receiver used for the communication channel's beam.

The additional laser diode is preferably a pulsed laser diode with a relatively high peak power, but a very low average power. A long duty cycle associated with the pulsed laser diode prevents the laser output from exceeding eye safety limits. The additional receiver can be any suitable receiver. In one embodiment the additional receiver consists of a monitor photodiode, which may be contained in the same package as the additional laser diode. However, it should be noted that any receiver that meets the necessary spectral sensitivity requirements could be used.

The laser is pointed at a corresponding node and the transmitted pulses travel in parallel with the communication beam. The transmitted pulses are reflected from the opposite network node and return to transmitting node within a known fixed time period. This known fixed time period of the reflected beam is referred to herein as the time of flight. The receiver in the transmitting node receives the returned pulses.

Because the beam from the pulse laser is parallel and in close proximity to the communication beam, objects that interfere with the communication link also interfere with the pulse laser beam. When an interfering object is present, in a first scenario, the pulses bounce off the interfering object and return to the receiver in the transmitting node. When a time of flight is less than the known fixed time of flight, an interference is detected.

In a seconds scenario, when an interfering object is present, the object absorbs the energy from the pulse laser and a reflected pulse is not detected. Accordingly, to account for both the above scenarios, the present invention determines whether the reflected pulse is detected within a window of expectation. If the reflected pulse is not detected within the window of expectation, an interference is detected. In response to this detection, a signal is sent to the transmitter to shut down the communication beam. In one embodiment, the flight time is determined with the use of a timer that is initiated concurrently with each a pulse transmission.

Other methods of detecting an interference can also be implemented. For example, in another embodiment, a CCD camera is used to capture a reflection from an object in the path of the communication link. In this embodiment the CCD has an overlapping field of view with the communication transceiver's transmit laser. The reflection of the laser's transmission forms a baseline pattern on the CCD. Any pixel to pixel variation from the baseline pattern indicates an interference, thus triggering the system to shut down or reduce the power of the communication link.

It is noted that the pixel to pixel variation caused by an object interfering with the communications link is discernable from a change in weather conditions. This is important because the former requires a reduction in power or shut down, while the latter requires an increased power level. These conditions are discernable by noting that a change in the weather, for example fog, would cause a uniform change in the CCD pattern. Conversely, an interference would cause a non-uniform change in the CCD pattern. Therefore, weather phenomenon can be distinguished from object interference.

The CCD preferably has an infinite depth of field, but this consideration requires a trade off depending on the characteristics of the overall system and a given link. For example, one implementation uses pinhole optics to create an infinite depth of field. However, less light is collected in this implementation. Therefore, the amount of return energy in the reflected signal is a key parameter in deciding whether this type of implementation is acceptable. In another implementation, a long focal length lens is used to increase the depth of field.

Another embodiment uses retroreflection of the human eye to detect interference by the human eye and an optical magnification device. In this embodiment, a CCD is used to detect signals bent back by retroreflection of the human eye. When such a signal is detected, the link is immediately shut down.

Another embodiment of the present invention utilizes the communication link itself. If an instantaneous power drop is detected, the system determines that an interference has occurred and shuts down or reduces the power of the communication beam.

Further features and advantages of this invention as well as the structure and operation of various embodiments are described in detail below with reference to the accompanying drawings.

BRIEF DESCRIPTION OF THE DRAWINGS

The present invention is described with reference to the accompanying drawings. In the drawings, like reference numbers indicate identical or, functionally similar elements. Additionally, the left-most digit(s) of a reference number identifies the drawing in which the reference number first appears.

DETAILED DESCRIPTION OF THE INVENTION

The present invention is directed toward a system and method for detecting an interference with an optical communications channel. Specifically, a novel optical communication network is provided. In accordance with the several aspects of the invention, a method of detecting interference with one of the optical communication network links is provided. The method and its various embodiments allow the optical communication network to operate in a fully eye safe mode. The system can maintain eye safety even if a human eye aided by magnifying optics, such as binoculars, were to come into the direct line of the networks laser transmissions. Additionally, the detection of interference allows the system to operate more efficiently due to the diagnostic benefits of interference detection.

Figure 1:
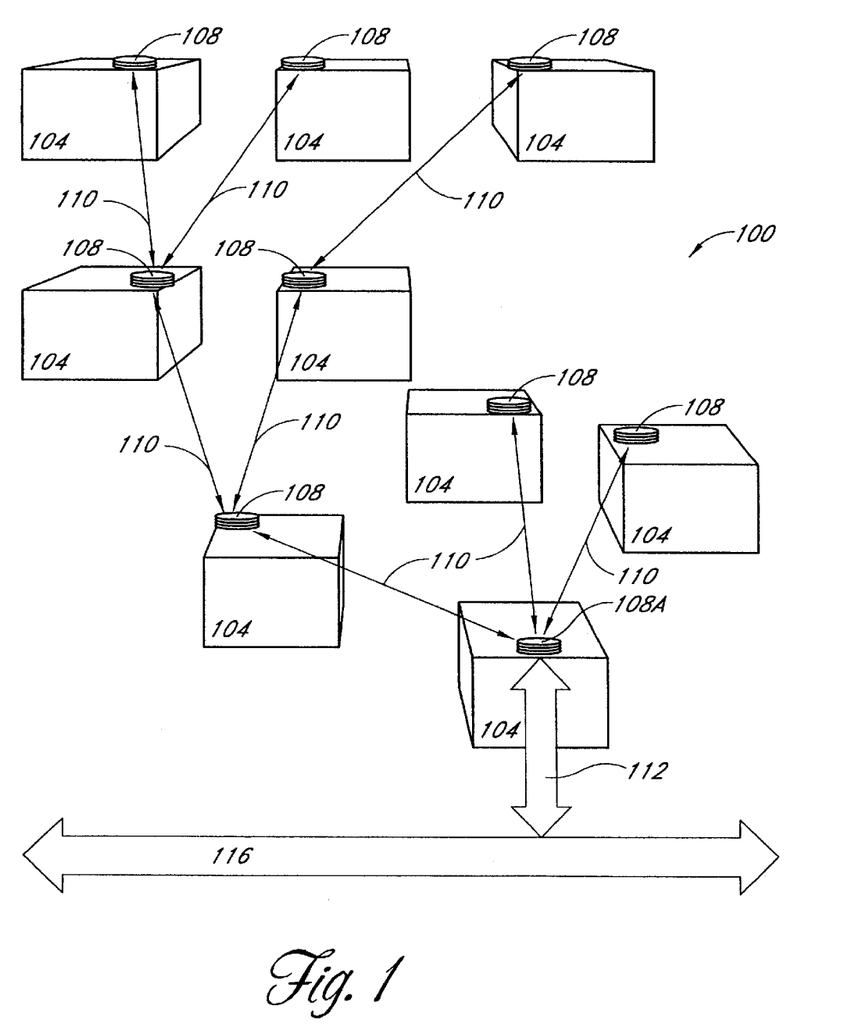
FIG. 1 is a block diagram illustrating an optical communications network in accordance with the present invention.

FIG. 1 is a diagram illustrating an example communication network 100 according to one embodiment of the invention. The example communication network 100 illustrated can include a plurality of nodes 108 interconnected by communication links 110. In one example network the nodes 108 are placed on facilities 104. Although only one node 108 is provided per facility in the example illustrated in FIG. 1, more than one node 108 can be provided at one or more facilities 104, depending on the communication requirements and depending on the particular facility.

In one example, facilities 104 can be buildings, towers or other structures, premises, or locations. Advantageously, facilities 104 can, for example be homes or offices to which it is desirable to interface one or more backbone networks of one or more common carriers or service providers. In this example, network 100 can provide the interface between the facilities and the backbone network.

In this example, nodes 108 are interconnected with one another by optical communication links 110. Therefore, nodes 108 can include one or more optical transmitters and receivers to provide the communication links 110 among the plurality of nodes 108. The number of transmitters and receivers provided at a given node 108 can be varied depending on the fan-out capabilities desired at that node 108. But in the example, each node 108 has four transceivers, allowing each node 108 to connect its associated facility 104 with up to four additional nodes 108 at four additional facilities 104. The provision of both a receiver and transmitter (i.e., transceiver) for each fan out of the node 108 allows bi-directional communication among nodes 108.

The transceivers at nodes 108 are implemented using lasers or LEDS as the optical transmitters and charge-coupled devices (CCDs), photomultiplier tubes (PMTs), photodiode detectors (PDDs) or other photodetectors as the receivers. Although the network 100 illustrated in FIG. 1 is illustrated as a mesh structure, other network structures can be implemented, such as a rooted tree structure, etc.

The network 100 can be implemented and utilized to directly connect a plurality of customers in one or more facilities 104 to a high-capacity communication network 116. For example, network 100 can be used to connect the plurality of customers to a copper or optical fiber backbone network. Advantageously, the network can therefore allow the customers to access a high data rate, high-bandwidth communication network from their home, office or other facility, regardless of the existing connection capabilities within that facility. Thus, network 100 can be implemented to avoid the need to cable a backbone network over the "last mile" to each facility 104.

To accomplish this objective, at least one of nodes 108 is designated as a root node 108A. Root node 108A includes additional functionality to interface the communication network 100 to a provider network 116 via another communication link 112. In one embodiment, provider network 116 can, for example, be a high bandwidth copper or fiber service provider or common-carrier network 116.

Figure 2:
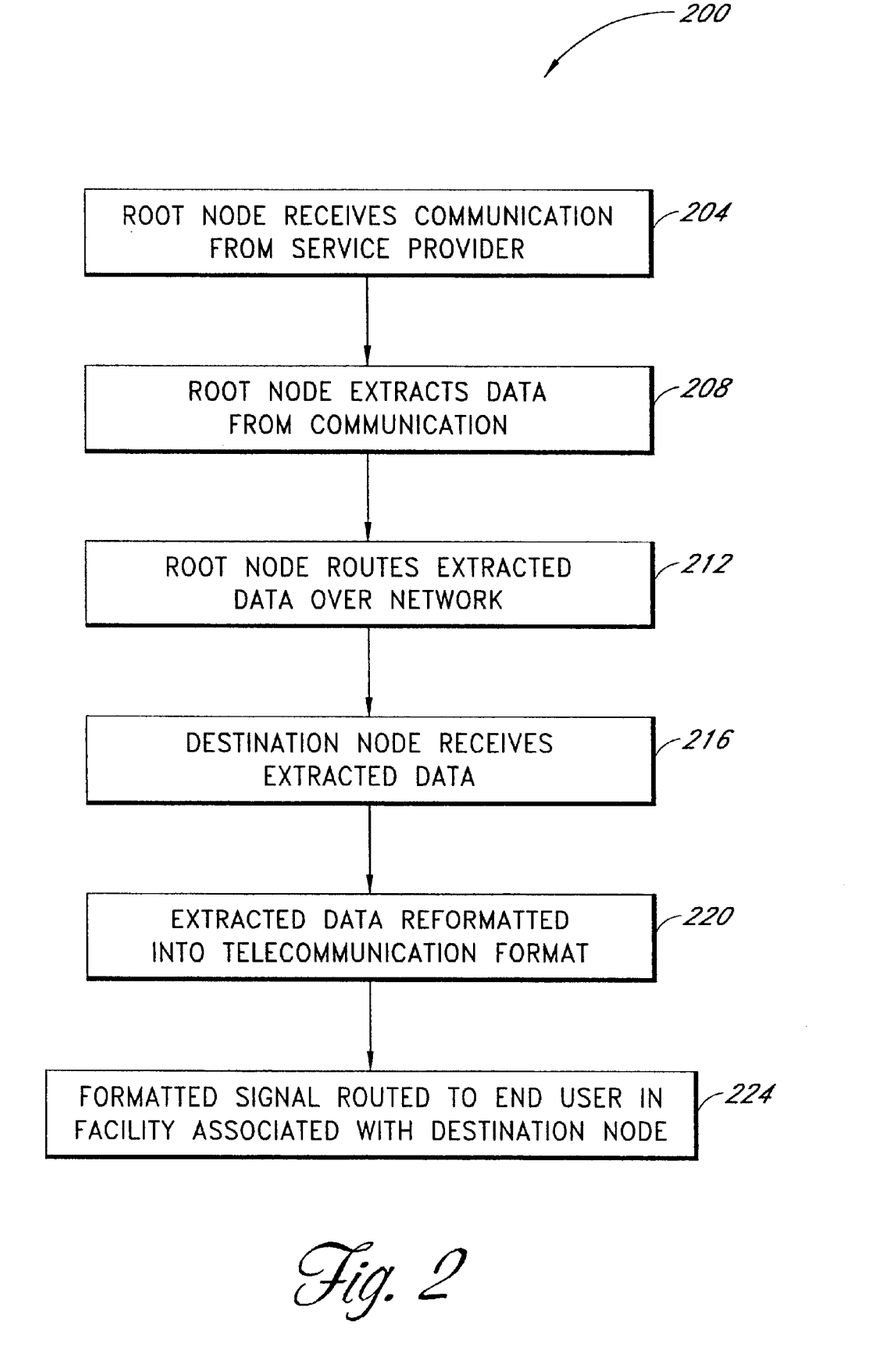
FIG. 2 is an operational flow diagram illustrating an example process by which the communications network could operate.

FIG. 2 is an operational flow diagram illustrating a process by which the communication network operates. In a step 204, a root node 108A of communication network 100 receives a communication from the provider network 116. In a step 208, root node 108A accepts the communication and, if necessary or desired, reformats the communication into a format that can be transported across the network of nodes 108 and communication links 110. For example, where network 100 is a packet-switched network, root node 108A formats the communication into packets suitable for transmission across the optical communication links 110.

Root node 108A may also determine routing information such that the data can be sent to the appropriate destination node 108, also referred to as a premise node 108. In examples using packet data, the routing information can be included in the packet header of the packets being sent across network 100. In alternative network geometry, a designation of the destination node 108 may be used in place of or in addition to routing information. For example, ring geometry use destination information as an address for the packets in place of routing information.

In a step 212, root node 108A routes the reformatted data across the network 100 to the designated destination node 108. The route may be directly to destination node 108 or via one or more intermediate nodes 108, which are referred to as junction nodes 108 in this capacity. If using packet data, for example, junction nodes 108 may use packet header information to route a received packet to the next node 108.

In a step 216, the destination node 108 receives the data. The received data is forwarded to the end user at the facility 104 associated with the destination node 108. This is illustrated by step 224. Prior to forwarding the data to the end user, the data is reformatted. The data is, for example, reformatted into a telecommunications format such as the original format that the data was in when it was received from provider network 116. This is illustrated by step 220.

In this example, the fact that the user is interfaced to the provider network 116 via the network of links 110 and nodes 108 is preferably transparent to the user. Communications from the user to the provider network 116 can similarly take place, but in the reverse order. Thus, network 100 can provide a two-way connection between one or more users in one or more facilities 104 with provider network 116. Although only one provider network 116 is illustrated in FIG. 1, one or more root nodes 108A can be used to, interface to more than one provider network 116.

Figure 3:
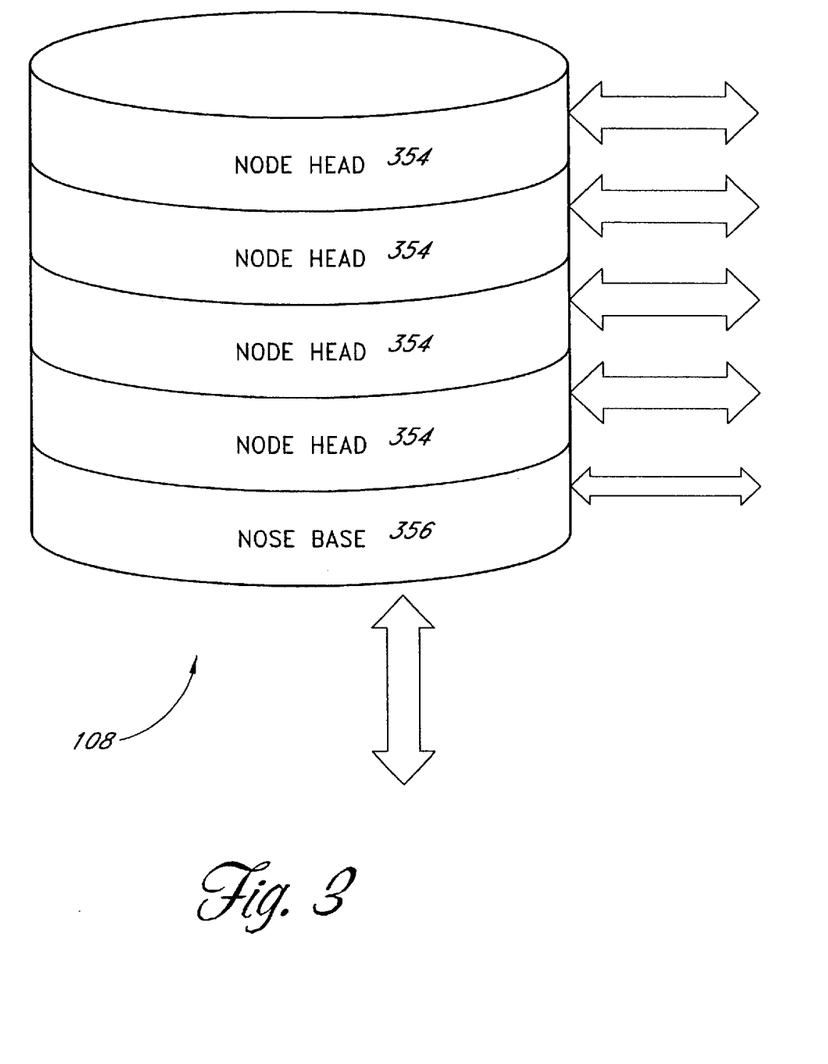
FIG. 3 is a diagram illustrating one example implementation of a node in the communications network.

FIG. 3 is a diagram illustrating an example implementation of a node 108. The example implementation is generally cylindrical in shape and includes four node heads 354 and a node base 356. Node heads 354 can each include a transceiver to facilitate communication with one or more other nodes 108 in a network 100. In this example, there is a single transceiver in each node head 354, and each node head 354 provides a communication link 110 with one other node 108 in the network 100 at a given time.

Preferably, each transceiver has both a receiver and a transmitter, providing two-way communications. But a node head 354 could have just a transmitter or just a receiver, thereby providing one-way communications. Additionally, it is possible for one or more node heads 354 to include more than one transceiver, or an additional receiver or transmitter to provide additional capabilities. In the example illustrated in FIG. 3, where each node head has a single transceiver, node 108 can communicate with up to four other nodes 108 at four separate locations. Other numbers of node head 354 can be included, depending on the fan-out capability desired for the node 108.

Preferably each node head 354 includes a pointing mechanism such that it can be rotated to point to a designated other node 108. For example, such pointing can be performed in both azimuth and elevation. Ideally, each node head 354 can be independently pointed to a designated node 108.

The example implementation illustrated in FIG. 3 is substantially cylindrical in shape. This facilitates pointing to other nodes in a full 360-degree circle. One advantage of this shape is that an optical communication beam is always at a substantially right angle with respect to the cylindrical housing, regardless of pointing. This helps to maximize the transmitted beam power. Note that the housing for each node head 354 could also be shaped as a portion of a cylinder in the vertical direction to allow perpendicular passage of the beam through the housing as the beam is pointed in the elevation direction. Of course, alternative shapes for the housing can be implemented as well.

It should also be noted that one or more node heads 354 can be implemented with the communications equipment to allow them to communicate with equipment other than another node 108. This equipment can be implemented using, for example, wireless RF communications or other communications techniques. But this example is concerned solely with the optical communications links.

Figure 4:
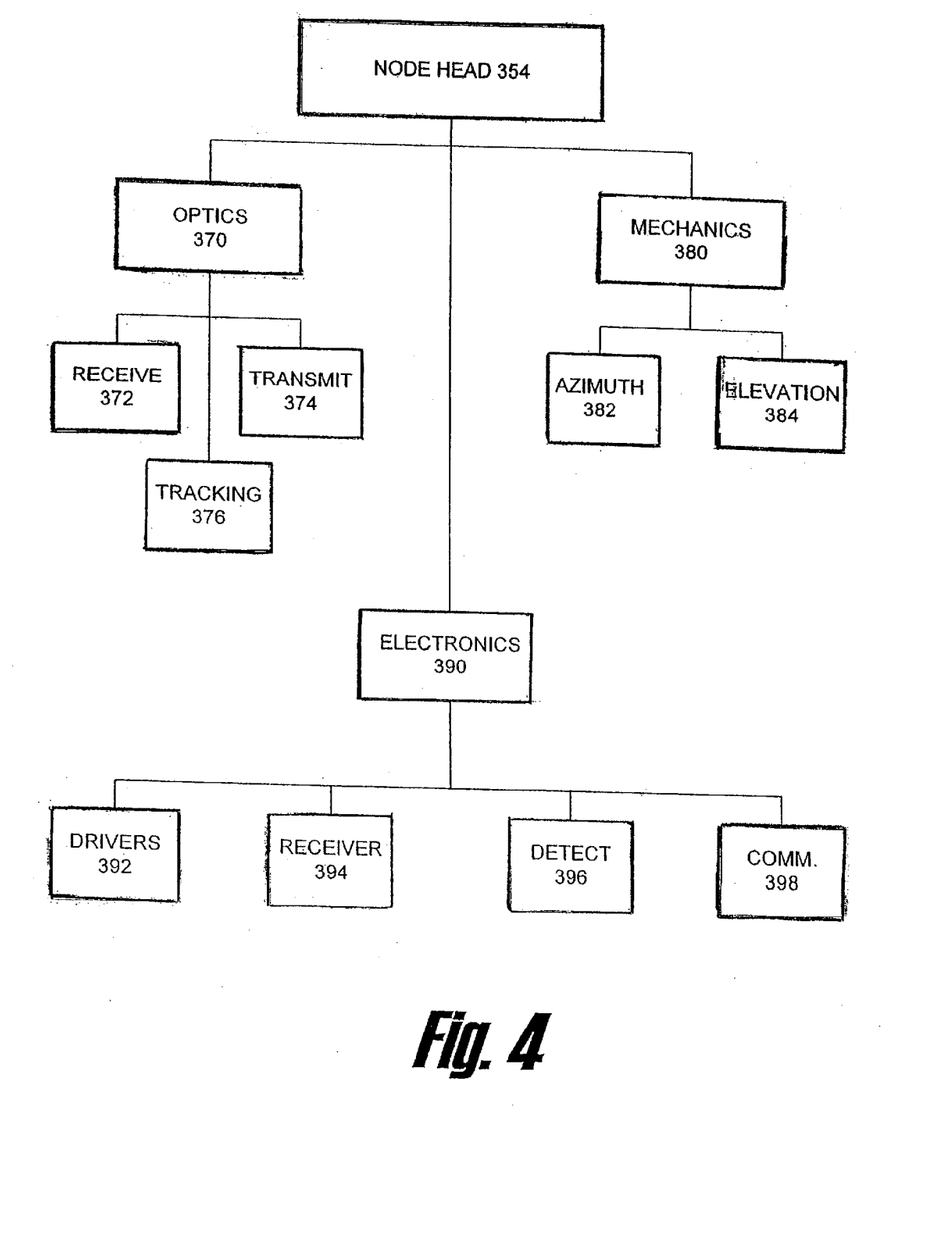
FIG. 4 is a block diagram illustrating a logical breakout of components that could be included in an example node head.

FIG. 4 is an block diagram illustrating a logical breakout of components that can be included in an example node head 354 according to one embodiment of the invention. This logical grouping is provided for discussion purposes only, and should not be interpreted to require a specific physical architecture for a node head 354.

Referring now to FIG. 4, the example node head 354 can have three logical groupings of components: optics 370, mechanics 380, and electronics 390. For node heads 354 having transceivers, the optics includes transmit optics 374, receive optics 372 and tracking optics 376. The optics can also include associated electro-optics such as a laser transmitter, a CCD detector, and so on. The transmitter and detector are boresighted to each other during manufacture, such that bi-directional pointing accuracy can be established and maintained.

The mechanics 380 can include gimbal platforms and an enclosure to isolate the electronics from the elements. In this case, gimbal platforms are an azimuth gimbal 382 and an elevation gimbal 384. This azimuth/elevation configuration is preferred in that it allows pointing to nodes 108 at a wide range of bearings. In his example, each node head 354 is capable of rotating 370° in azimuth and ±20° in elevation for pointing to another node 108, although other ranges are permissible.

Note that other platforms can be used, including, for example, X-Y optical mounts. A motor or other drive mechanism can be used to drive the gimbals. In one example, the motor is a belt-driven stepper motor, although direct drive motors or geared arrangements can be used as well. Optical encoders and limit stops/switches can be included to enable precise pointing.

The housing is an acrylic housing, transparent to the wavelength of communication link 110. The housing can also serve as a filter to filter out unwanted noise from wavelengths other than that of communication link 110. For example, where the communication wavelength is 780 nanometers (nm), the housing can provide a 780 nm band pass filter. In this example, each housing is approximately 4.5 inches high and twelve inches in diameter, although other dimensions are possible. Preferably, the exterior dimensions are minimized to the extent possible based on the size and placement of components of node head 354.

In addition, the housing serves as a laser eye safety device. That is, in the configuration described above, the distance between the laser and the housing surface is far enough to decrease the density of the laser to safe levels as to not cause eye damage to an unaided human eye.

The electronics 390 can include the transmitter drivers 392, receivers 394, detection electronics 396, and communications 398. In this example, the transmitter is a semiconductor laser diode modulated in the on-off keyed (OOK) mode at approximately 780 nanometers (nm) wavelength at approximately 20 milliwatts (mW) average power. The divergence of the beam is preferably 1.5 milliradians (mrad), and is eye safe at aperture. Of course, alternative technologies can be implemented with transmitters operating at different wavelengths, power, and divergence.

The receiver can be implemented using an optical detector in optical embodiments. For example the receiver is implemented as a PIN or avalanche photodiode detector (APD) with a 50 mm aperture, to detect the total amount of transmitter power received. Although more sensitive than the PIN photodiode by approximately 10 dB, the avalanche photodiode is generally more complicated to implement. As such, the PIN detector is favored in applications where the link margin permits. Other detectors can be utilized to detect energy at optical or other wavelengths depending on the application.

The detection electronics can include, in one embodiment a quadrant PIN detector, with a 2 degree field of view, and location in the optical path of the receiver. Preferably, the quadrant detector is separated from the receiver by a 4% beamsplitter. The 4% fraction of the received signal is imaged onto a quadrant detector that generates an error signal, depending on the relative signal strength in each quadrant. The error signal is processed to determine a pointing offset. The pointing offset is used to generate an error signal to drive the azimuth and elevation gimbals 382, 284 to correct for the pointing error. A processor is used to maintain the tracking loop. The processor provides other control and communication functions for node head 354.

The photodetector is located at the focus of an 80-mm focal length, 50-mm diameter doublet lens. A 20 mm diameter, 20 nm (nanometer) bandwidth bent pass filter centered at 780 nm is located directly in front of the received photo diode which is 600 microns in diameter. Light collected by the received lens is imaged to a spot on the received photo diode.

The communication electronics 398 is used to interface the node head 354 to node base 356. In one example a bus connects the plurality of node heads 354 to node base 356. In this example, a multiplexer can be provided as part of communication electronics 398 to allow communications among the various elements over a shared bus.

Figure 5:
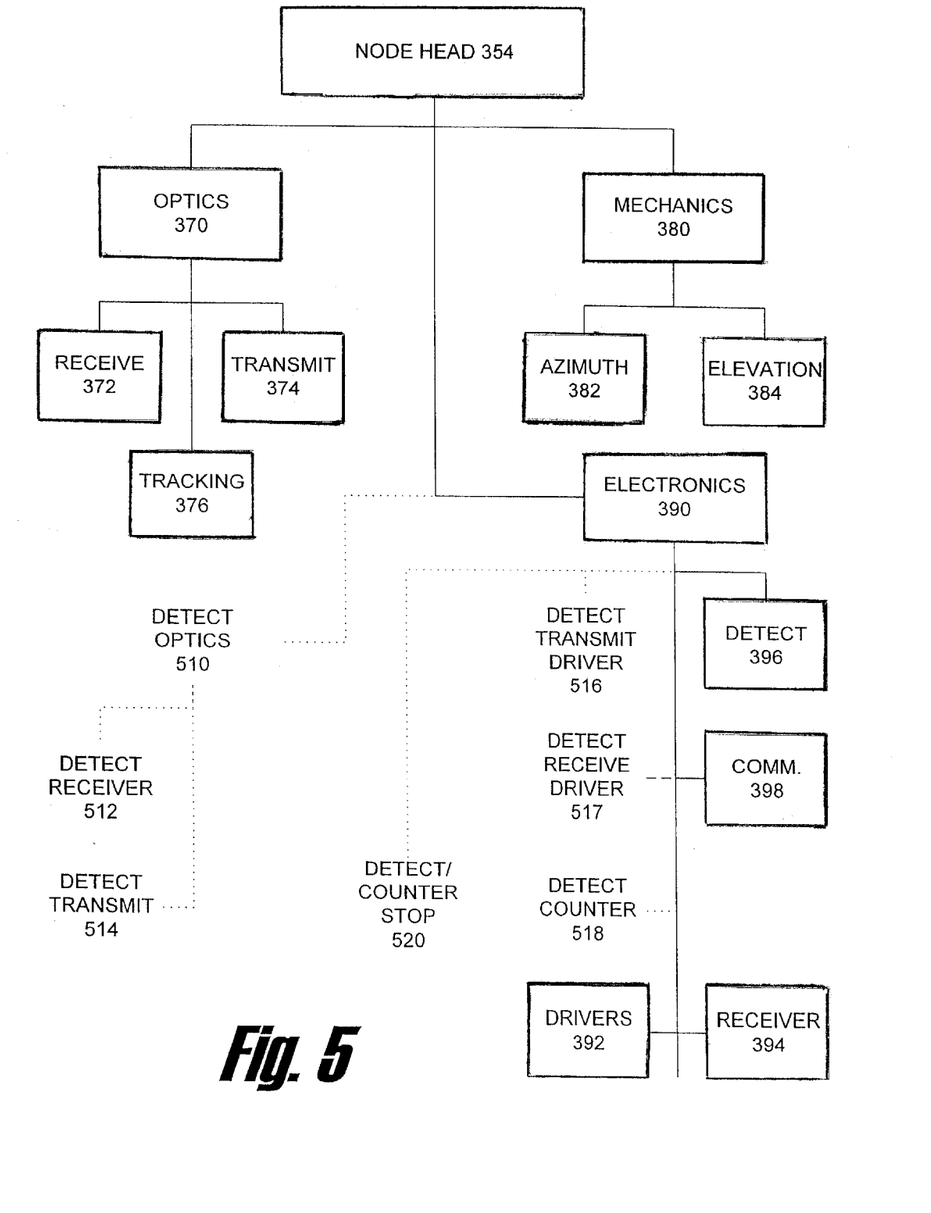
FIG. 5 is a block diagram depicting additional components that can be used in various embodiments of the present invention.

FIG. 5 is a block diagram depicting additional components that can be used in various embodiments of the present invention. In particular, the block diagram depicts the same logical components of a typical node head 354 as presented in FIG. 4, but additionally includes various components that can be used to perform the interference detection and communication link shutdown, in accordance with various embodiments of the present invention. The additional blocks and connections are shown with dotted lines to indicate that they may or may not be included, depending on the each particular embodiment of the present invention. This logical grouping is provided for discussion purposes only, and should not be interpreted to require a specific physical architecture for a node head 354.

An additional logical group referred to as the detect optics group 510 is added to the node head 354. In one or more embodiments of the present invention, the detect optics group 510 includes a detect transmit component 514 and a detect receive component 514.

The detect transmit component 514 transmits, an optical signal for the purpose of detecting interference. The detection signal preferably travels in parallel with the communication link and is reflected by the opposite network node. In one embodiment, the detect transmission component 514 is a pulsed laser diode with a relatively high peak power, but a very low average power. A long duty cycle associated with the pulsed laser diode prevents the laser output from exceeding eye safety limits.

Alternatively, in other embodiments, the transmit component 374 of the optics group 370 is used as the interference detection signal. That is, in alternate embodiments the communication beam itself, rather than an additional detection beam, is used to detect the presence of interference. Details of this alternate embodiment are described below.

In one embodiment of the present invention, the detect optics group 510 includes a detect receive component 512. The purpose of the detect receive component 512 is to receive the reflected detect signal. The reflected detect signal is reflected back by the opposite network node when no interference is present in the beam. When interference is present, the detect signal is reflected back from an object that is presumably interfering with the communication beam.

Typically, the detect receive component 512 is a monitor photodiode. In a preferred embodiment, the monitor photodiode may be contained in the same package of the laser diode used for the detect transmit component 514. However, it should be noted that any receiver that meets the necessary spectral sensitivity requirements could be used as the detect receiver component 512.

Additional components in the electronics group 390 depend on each specific embodiment of the present invention. For example, in at least one embodiment, where the detect optics transmit component 514 is included, an associated transmit detect driver 516 is also included. Similarly, where a detect receiver 512 is used, an associated detect receiver driver 517 is also included.

In one embodiment of the present invention, a detect counter 518 is used to determine the window of expectation associated with a round trip flight time of a reflected signal. The counter 518 is started when a pulse is sent by the detect transmit component 514. This flight time is used to determine if interference exists in the communication path. Typically a detect/counter stop component 520 is used to detect the reception of a reflected signal in receiver 512 and stop the counter 518. Otherwise the counter is stopped after the time associated with the window of expectation has expired. In the event that a detect counter 518 is used, the detect/counter stop 520 component will stop the counter so that the flight time can be determined.

Figure 6:
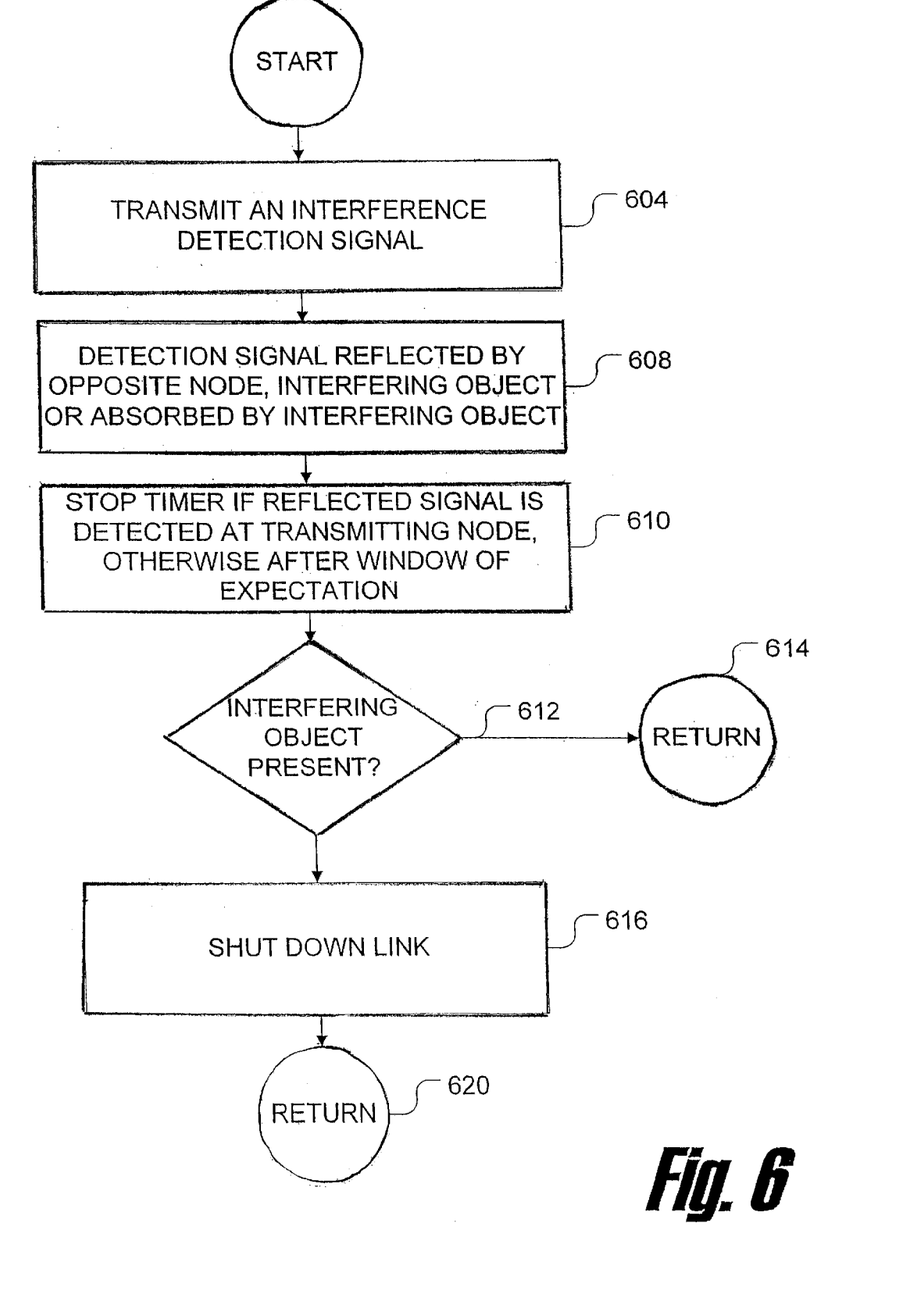
FIG. 6 is a flowchart that depicts an operational method that illustrates a process by which interference can be detected in accordance with one embodiment of the present invention.

FIG. 6 is a flowchart that depicts, an operational method that illustrates a process by which interference can be detected in accordance with one embodiment of the present invention. The process begins with step 604. In step 604 an interference detection signal is transmitted. In this example embodiment of the present invention, the source of the interference detection signal in step 604 is a pulse laser device that is separate from the communication channel's laser device. This additional pulse laser device sends pulses at a predetermined duty cycle.

Next, as indicated by step 608, the detection signal is reflected off the opposite node, interfering object, or is absorbed by the interfering object. Specifically, when there is no interference present, the detection signal is reflected off the opposite network node. Conversely, when an interference is present in the optical path between the transmitting node and receiving node, the detection signal from step 604 is reflected or absorbed by the interfering object.

Next, as indicated by step 610, the counter 518 is stopped upon either of the following two conditions: (1) receipt of a reflected signal within the window of expectation; or (2) expiration of the window of expectation. As stated, the window of expectation is associated with the known flight time of the detection signal. If the window of expectation has elapsed, the detection signal has been absorbed by an interfering object and will therefore not be reflected back to the transmitting node.

Step 612 determines that interference exists if the counter 518 indicates the time of flight is less than expected, or a value of the counter 518 is equal or above the value associated with the window of expectation. Thus, as indicated by step 616, if an interfering object is detected, the communication link is shut down, or alternatively, powered down to safe levels. This prevents the possibility of eye damage in the event that the interference is caused by a person using binoculars, or some other optical magnifier, and has focused them on the communication laser output beam.

Figure 7:
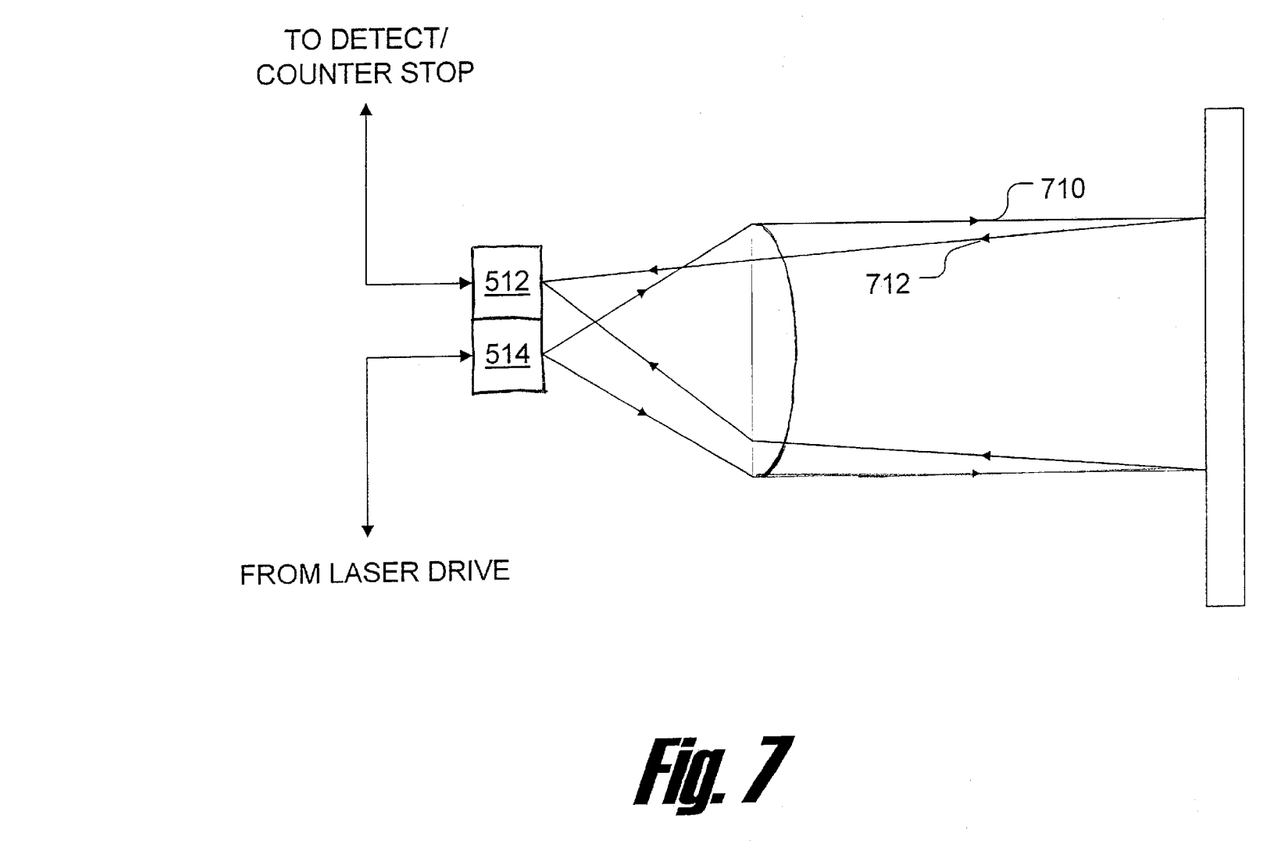
FIG. 7 is a diagram depicting some of the components and the geometry of a detection beam 710 in accordance with one embodiment of the present invention.

FIG. 7 is a diagram depicting some of the components, and the detection beam 710 in accordance with one embodiment of the present invention. In this embodiment, as described above, an additional interference detection laser 514, that is separate and distinct from the communication channel's laser (not shown) is used for the detection of interference. As stated, because this detection beam 710 is parallel and in very close proximity to the communication beam (not shown), it is assumed that an interference with the detection beam 710 is paramount to an interference with the communication beam.

In one implementation, the transmitter 514 is a pulsed infrared laser diode. The pulsed laser diode transmits pulses at a low duty cycle in parallel with the communications beam. In one implementation the pulse laser output 710 is centered at 904 nm and has a peak power of 19 watts (W). The output pulses are transmitted at peak power, however, the low duty cycle maintains eye safety levels. For example, in one implementation, the pulse is 1 microsecond ($\mu s$) long and has a duty cycle of 1 millisecond (ms). The duty cycle is then 1%. A low duty cycle is preferred so that the detection beam is eye safe.

It should be noted that other implementations using different wavelengths, peak powers or duty cycles are possible depending on the system parameters such as link length and power required to effectively detect an interference. Additionally, other types of laser's, i.e. continues wave (cw) lasers, may be used. The pulsed laser, however, is preferred for this embodiment for reasons of eye safety and overall system design. Note that the use of the pulse laser requires a pulse generator (described below) to drive the pulse laser device. Therefore, the detect transmit driver 516 is included in this example implementation of the present invention.

In one example embodiment of the present invention, the detect receiver 512 is a monitor photodiode. This can be contained in the same package as the pulse laser diode 514. While the monitor phototdiode 512 is preferred for simplicity, any detector could be used that possesses the correct spectral sensitivity parameters. The monitor photodiode 512 preferably has the same field of view (see 710) as the pulse laser, thus enabling it to receive pulses that are reflected back. The angles of the optical transmission paths illustrated in FIG. 7 are not intended to be accurate renditions, but are used for exemplary purposes only. This figure illustrates the overlapping fields of view for the pulse laser 514 and the end monitor photodiode 512.

Accordingly, as shown, the pulse laser device sends a beam that is reflected by opposite network node. Note that when an interference is present, the pulse laser beam is reflected back by the interfering object. In any case, the reflected beam 712 is detected by the detection receiver 512.

Figure 8:
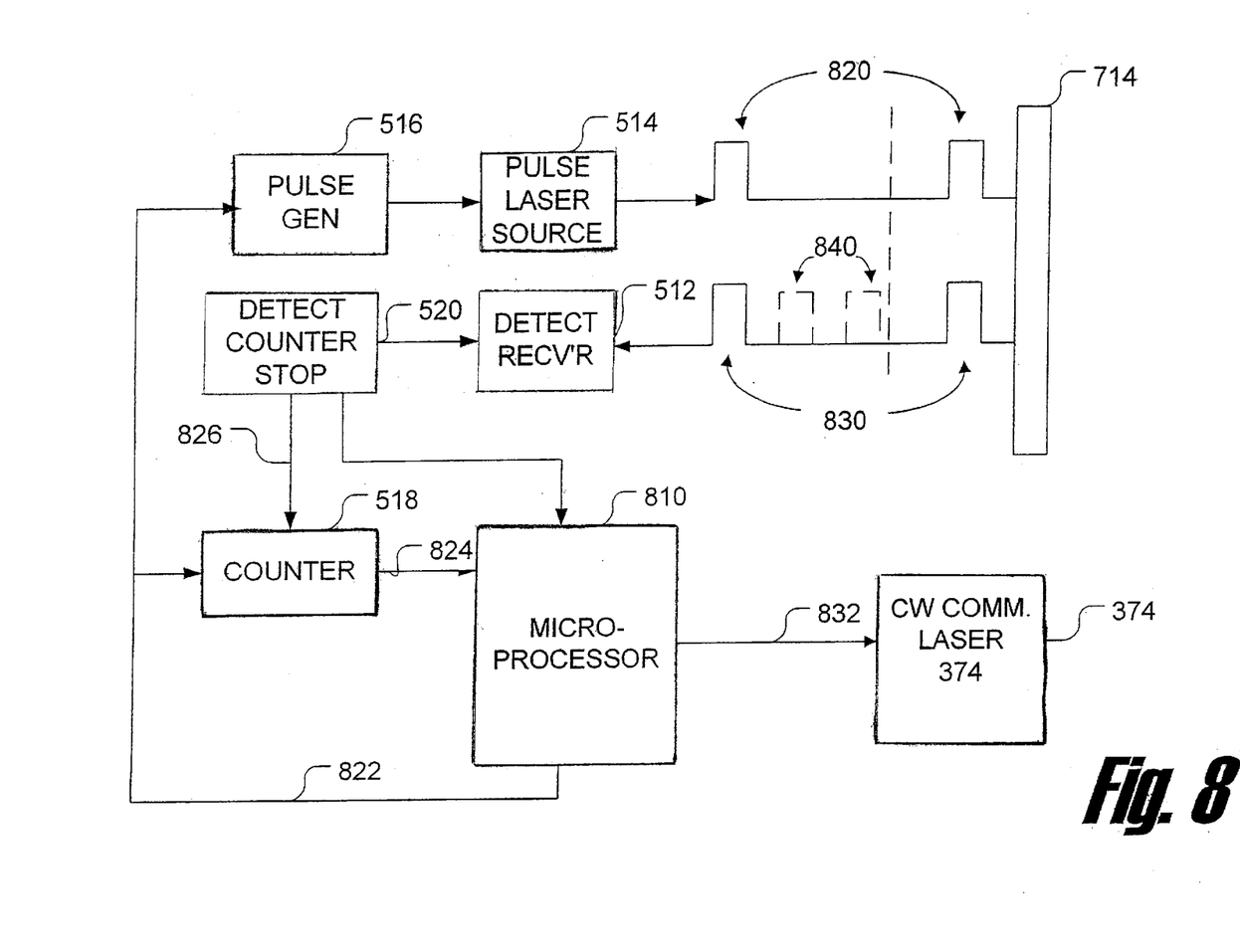
FIG. 8 is a block diagram depicting components that can be used to implement one embodiment of the present invention.

FIG. 8 is a block diagram depicting components that can be used to implement one embodiment of the present invention. This embodiment includes a microprocessor 810. The microprocessor 810 can be any type of off-the-shelf or custom made microprocessor or other custom logic chip. For example, a custom made ASIC can be used instead of the microprocessor 810. In addition, the microprocessor 810 is coupled with a memory bus, address bus, memory devices for local and program storage, input/out devices and the like. These common devices are not shown in FIG. 8 for simplicity.

The microprocessor 810 in this example, controls a pulse generator 516 and a counter 518, via a control line 822. The pulse generator 516 drives the pulse laser 514 to transmit pulses 820. In this example embodiment, the pulses 820 are transmitted every millisecond and are 1 μs in duration. The transmitted pulses 820 reflect off the opposite node 714 and return as shown by the pulses 830. The reflected pulses 830 are received by the detect receiver 512.

In the event that the transmitted pulses 820 hit an interference object, the pulses return at odd timing intervals, as illustrated by the interference pulses 840. These interference pulses 840 are also detected by the detect receiver 512.

When the reflected pulses are received (i.e. the return 820 or interference pulses 830) the detect/counter stop circuit 520 halts the counter 518, via the control line 826. In one example, the microprocessor 810 is interrupted so that it can read the output 824 from the counter 518 as shown. If the counter indicates that the time of flight for a given received pulse was less than the expected time for a return pulse 830, then the processor will shut down the communications laser 374, via the control line 832. Alternatively, the microprocessor controls the laser 374 so that the power is reduced to safe levels.

Figure 9:
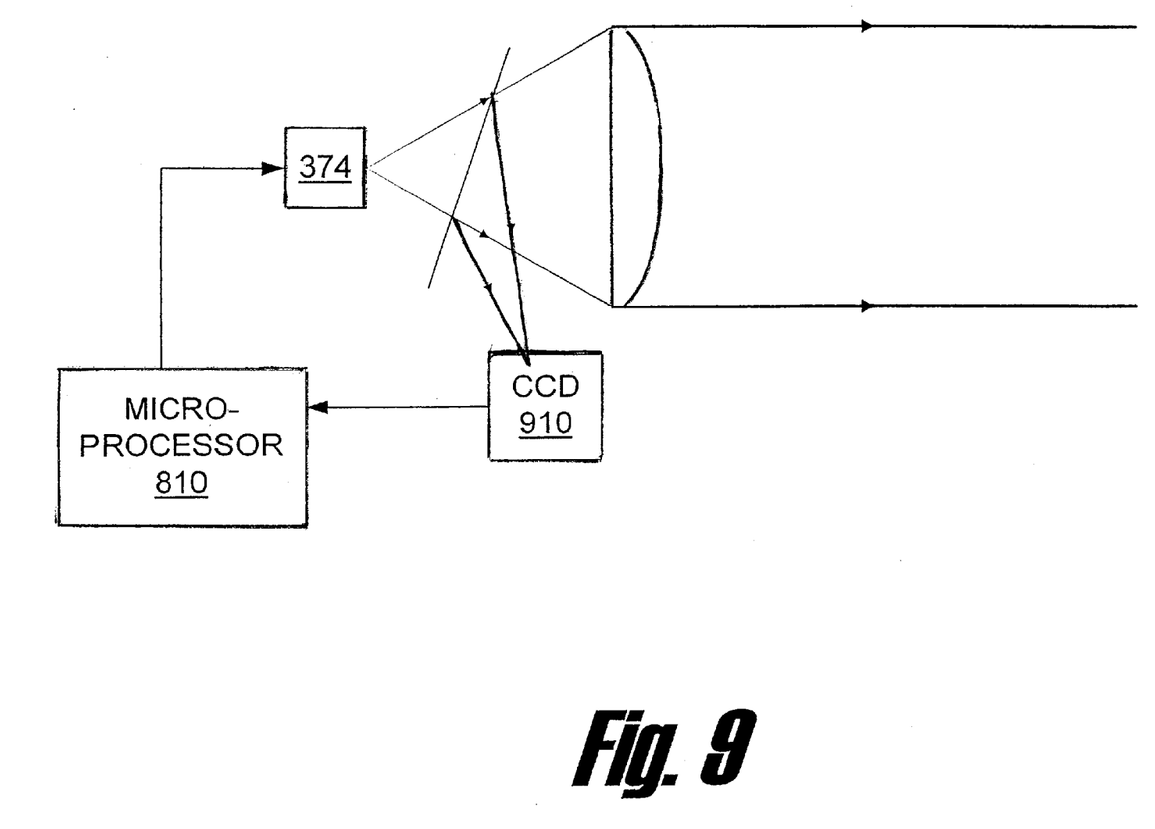
FIG. 9 is a diagram illustrating components that could be used in an example implementation using a CCD in accordance with the present invention.

An alternative embodiment of the present invention is illustrated in FIG. 9. In this alternative embodiment the communications laser 374 is used to enable detection of interference. This method is preferred when adding a second laser source is undesirable. In one implementation of the present invention, the communication laser 374 is a semiconductor laser diode. The laser operates in a continuous wave (cw) fashion and is modulated in the on-off keyed mode at approximately 780 nm and has a 20 mW average power. The divergence of the beam is preferably 1.5 mrad and is eye safe at the aperture, as described above. Alternative technologies can be implemented with lasers operating at different wavelengths, power and divergence.

In one implementation, the pattern of the communications laser 374 is captured using a CCD camera 910. The CCD camera 910 shares the same field of view as the laser 374. In this example embodiment, the CCD pixel to pixel pattern is used as a baseline. Accordingly, when an object interferes with the communication transmission, the pixel to pixel pattern of the CCD will change in a non-uniform way. The non-uniform change can be contrasted with a change in the weather that will cause a uniform pixel to pixel variation in the CCD pattern. Therefore, a non-uniform pixel to pixel variation will indicate that the processor 810 must shut down the communication laser or otherwise disable the potential eye damaging link.

In one implementation, a neural network is used to detect patterns that are associated with particular types of interference. For example, a neural network can be used to train the system to detect the presence of a human eye in combination with an external optics system, and distinguish that from changes due to whether related phenomena. In this fashion, certain types of interference can be distinguished from other types in order to make intelligent decisions about whether to shut down the communication beam.

In one example implementation, pinhole hole optics are used to give the CCD a larger depth of field. Ideally, the depth of field would be infinite in this example embodiment. An infinite depth of filed is desired because the CCD is not being focused at a specific point along the communications link and an interference could occur at any point in the link. Therefore, the CCD 910 needs to discern an interference at any point along the link with equal resolution. Thus an infinite depth of field is implemented in the preferred embodiment.

In yet another implementation of the present invention, the depth of field is increased using a long focal length lens. The long focal length lens, however, is more difficult to package. Therefore, the overall construction of the node should be considered when selecting this implementation. On the other hand, the pinhole optics allows less light to fall on the CCD. Therefore, the overall link length and receive energy requirement should be considered when selecting the pinhole implementation as described above.

Figure 10:
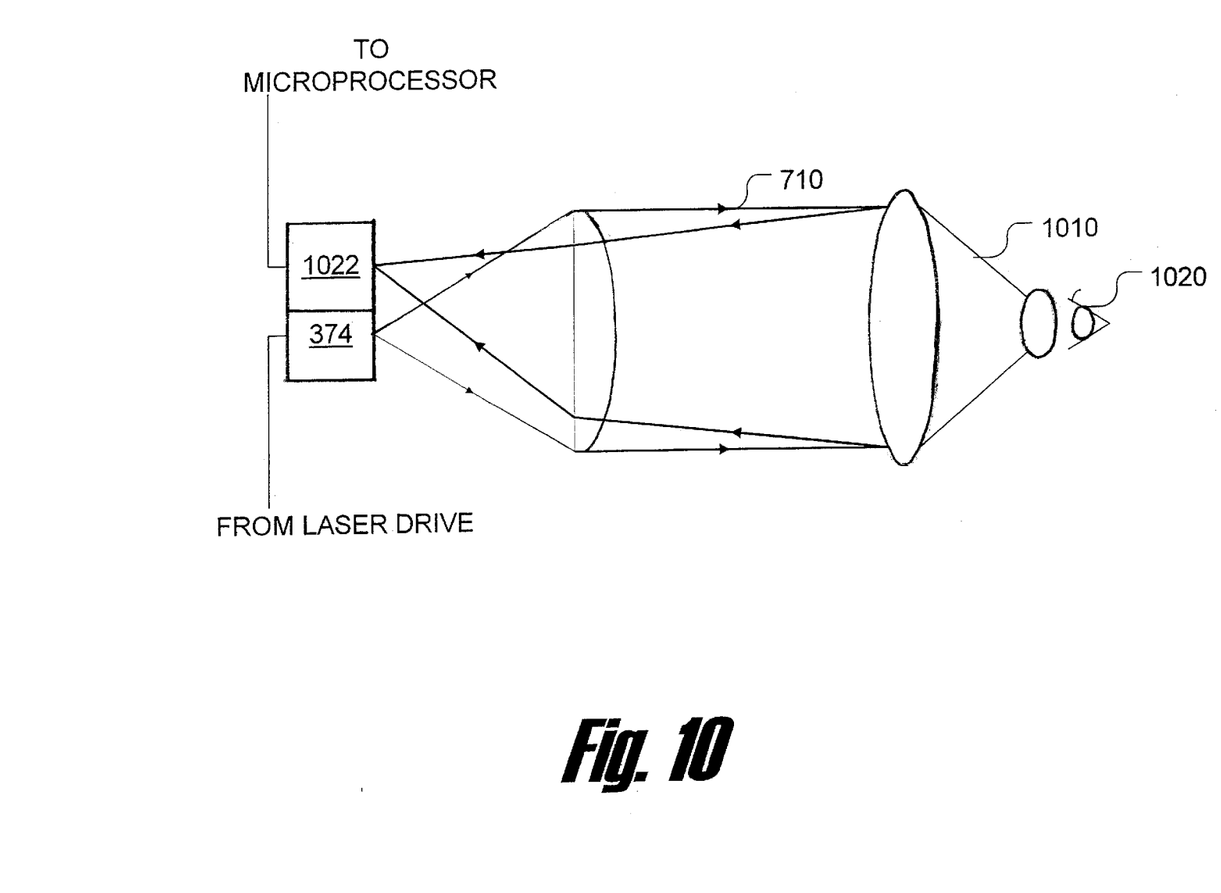
FIG. 10 is a diagram illustrating components that could be used in an example implementation to detect eye retroreflection in accordance with the invention.

Another alternative embodiment of the present invention is illustrated in FIG. 10. In this embodiment of the present invention, the communication beam is again used to detect the presence of an interfering object. This embodiment specifically detects the presence of a human eye that is aided by magnifying optics. The magnifying optics could be binoculars, a telescope or any other type of lens. The reflective characteristic of the human eye is utilized in this embodiment.

Accordingly, as shown in FIG. 10, the communications laser 374 transmits a signal 710. A portion of the signal 710 is intercepted by the magnifying optics 1010 and is magnified onto the human eye 1020. The eye 1020 bends the reflected transmission back towards the transmitting node, where CCD 1022 or other suitable detector receives the reflected signal. The reception of the retroreflection signals the microprocessor (not shown) to shut down the communication link. In this embodiment the link length, energy reflected by the human eye, and detector selected should all be considered to ensure interference detection along the entire link.

Another alternative embodiment of the present invention also uses the communications laser 374. This embodiment may be preferred because it does not require any additional components than those shown in FIG. 4. This embodiment takes advantage of the fact that the detect component 396 already monitors the power of the received transmission to adjust for changes in whether and the like. For example, if the weather becomes foggy, the system detects a corresponding drop in the received power. Thus, to counteract this effect, the system commands the transmitter 374 to increase the power level of the communication beam.

The problem is, however, that an interference associated with eye safety may be more abrupt and less uniform than a weather change. Consequently, the current system design for detecting weather changes may not be sensitive enough to detect an eye safety interference. This is so because a temporary non-uniform object interfering with the communication channel may only cause a minor change in the power received and only for a short duration of time. Thus, because the system performance is not affected, no adjustment is required.

However, any interfering object will cause some power reduction, which can be detected. Thus, according to this example embodiment, any power drop that is detected is reported to the microprocessor. The microprocessor can then shut the link down or reduce the power of the communication beam to safe levels. It is noted that the power drop in these situations are minimal. Therefore, care must be taken to select appropriate thresholds and resolution to ensure that such interference will be detected. Further, gradual changes brought on by changes in weather, which will require turning the power up as opposed to shutting the link down, must be discerned from the abrupt power drop caused by an interference.

In one example embodiment, the system detects the absolute changes in power and the rate of changes in power. For example, in one embodiment, the communication link is shut down when a rate of change is detected that is above a certain threshold. That is, if the rate of change is sufficiently fast, the link may be shut down even for small drops in absolute power. Similarly, using this example, for slower rates of change, a higher absolute power drop may be required before the link is shutdown. Thus, a combination of rate of change and absolute power should be taken into account to determine if an interference is present.

It is noted that in the above example embodiment, when an interference is determined by the receiving node by detecting a drop in power with a sufficiently high rate of change in power, it sends a signal to the transmitting node to shut down the communication link.

In another embodiment, an automatic shut down procedure is implemented. In this example embodiment, when the receiving node determines that interference is present, it does not send a signal to the transmitting node. In fact, an attempt to send a signal to the transmitting node may indeed be unsuccessful due to the presence of interference. Instead, in this example embodiment, the receiving node simple shuts down its own transmitting beam.

In response the receiving node shutting down its transmitter, the original transmitting node will detect a sudden drop in power that is sufficient enough for it to take the same action, i.e., shut down its own transmitting beam. In this fashion, the end result (i.e. shutting down the transmission beam in both directions), is achieved without relying on any type of control signal being sent from one node to another.

While various embodiments of the present invention have been shown and described above, it should be understood that they have been presented by way of example only, and not limitation. It should be apparent to those of ordinary skill in the art that many other embodiments are possible without departing from the spirit and scope of the invention. Thus, the breadth and scope of the present invention should not be limited by any of the above-described exemplary embodiments, but should be defined only in accordance with the claims and their equivalents.

What is claimed is:

1. A system for producing an eye safe laser communication system having a first network node in data communications with a second network node via a communication beam generated by a communication transmitter, the system comprising:

a detect transmitter for transmitting a detect signal from the first network node to the second network node;

a detect receiver at the first network node for detecting a reflection of the detect signal;

a timing device at the first network node for determining the flight time of the reflected detect signal; and a control device coupled to said timing device for reducing the communication beam to an eye safe level, if the flight time is less than a predetermined threshold value in accordance with said timing device.

2. The system of claim 1, wherein said predetermined threshold value is a pre-calculated flight time of a non-interfering communication beam.

3. The system of claim 1, wherein said detect transmitter is a pulse laser device that generates a stream of pulses at fixed intervals.

4. The system of claim 3, wherein said timing device is a timer started concurrently with one of said pulses and stopped when said reflected detect signal is received by said detect receiver.

5. The system of claim 4, wherein said control device is a microprocessor.

6. The system of claim 5, wherein reducing the communication beam to an eye safe level is accomplished by sending a signal from the microprocessor to the communication transmitter.

7. The system of claim 6, wherein the signal from the microprocessor to the communication transmitter causes the communication transmitter to shut down.

8. A method for producing an eye safe laser communication system having a first network node in data communications with a second network node via a communication beam generated by a communication transmitter, the method comprising the steps of:

transmitting an interference detection signal from the first network node to the second network node;

receiving a reflection of the interference detection signal at the first network node;

starting a timer simultaneously with said transmitting step;

stopping the timer simultaneously with said receiving step;

reading a value from the time to determine a flight time of the interference detection signal;

comparing the flight time with a predetermined flight time associated with an interference detection signal having no interference;

determining that interference is present if said flight time is less than said predetermined flight time; and reducing power of the communication beam if interference is present in accordance with said examining step.

9. A method for producing an eye safe laser communication system having a first network node in data communications with a second network node via a communication beam generated by a communication transmitter, the method comprising the steps of:

transmitting an interference detection signal from the first network node to the second network node;

starting a timer coincident with said transmitting step;

stopping the timer upon receipt of a reflected signal or upon expiration of a predetermined window of expectation associated with a known round trip flight time of the detection signal;

determining if an interference is present in accordance with a value retrieved from the timer, wherein interference is present if the value is within the window of expectation; and reducing power of the communication beam if interference is present in accordance with said determining step.

* * * * *